United States Patent [19]
Machado et al.

[11] Patent Number: 4,857,263
[45] Date of Patent: Aug. 15, 1989

[54] STORAGE OF SPENT NUCLEAR FUEL

[75] Inventors: Octavio J. Machado, Pensacola; Jay T. Moore, Milton, both of Fla.; Barry F. Cooney, Pittsburgh, Pa.

[73] Assignee: Westinghouse Electric Corp., Pittsburgh, Pa.

[21] Appl. No.: 127,615

[22] Filed: Nov. 30, 1987

Related U.S. Application Data

[63] Continuation of Ser. No. 470,905, Mar. 1, 1983, abandoned.

[51] Int. Cl.⁴ .......................................... G21C 19/40
[52] U.S. Cl. .................................................. 376/272
[58] Field of Search ................................ 376/272, 462

[56] References Cited

U.S. PATENT DOCUMENTS

| | | | |
|---|---|---|---|
| 2,727,996 | 12/1955 | Rockwell et al. | 250/108 |
| 3,533,911 | 10/1970 | Fortescue et al. | 376/272 X |
| 3,859,533 | 1/1975 | Suvanto | 376/272 |
| 3,882,313 | 5/1975 | Siemens, Jr. | 250/507 |
| 4,006,362 | 2/1977 | Mollon et al. | 376/272 X |
| 4,010,375 | 3/1977 | Wachter et al. | 376/272 |
| 4,034,227 | 7/1977 | Soot | 250/507 |
| 4,039,842 | 8/1977 | Mollon | 376/272 X |
| 4,042,828 | 8/1977 | Rubinstein et al. | 250/506 X |
| 4,044,267 | 8/1977 | Bevilacqua | 376/272 |
| 4,088,897 | 5/1978 | Soot | 376/272 X |
| 4,096,392 | 6/1978 | Rubinstein et al. | 250/507 |
| 4,119,859 | 10/1978 | Karzmar et al. | 250/507 |
| 4,177,385 | 12/1979 | Bevilacqua | 376/272 |
| 4,177,386 | 12/1979 | Wachter et al. | 376/272 |
| 4,203,038 | 5/1980 | Tokahashi et al. | 250/507 |
| 4,233,518 | 11/1980 | Auyeung et al. | 250/507 |
| 4,243,889 | 1/1981 | Weber | 250/507 |
| 4,288,699 | 9/1981 | van der Vlis et al. | 376/272 |
| 4,319,960 | 3/1982 | Larson et al. | 376/272 |
| 4,366,115 | 12/1982 | Schlumpf | 376/272 |
| 4,382,060 | 5/1983 | Holtz et al. | 376/272 |
| 4,400,344 | 8/1983 | Wachter et al. | 376/272 |
| 4,695,424 | 9/1987 | Flynn | 376/272 |
| 4,746,487 | 5/1988 | Wachter | 376/272 |
| 4,788,030 | 11/1988 | Bosshard | 376/272 |

FOREIGN PATENT DOCUMENTS

| | | | |
|---|---|---|---|
| 0109461 | 5/1984 | European Pat. Off. | 376/272 |
| 7707212 | 3/1978 | Netherlands | 376/272 |

*Primary Examiner*—Deborah L. Kyle
*Assistant Examiner*—Daniel Wasil

[57] ABSTRACT

A rack for storing a maximum number of fuel assemblies in spent-fuel storage locations in a minimum space. The rack has locations each formed by bending a stainless-steel sheet into a hollow body of the generally rectangular cross section and with each side shaped so that the apices of the body project outwardly. Except for bodies along the outer periphery of the rack, the apex of each body is contiguous to the apex of an adjacent body. These contiguous apices are joined by spaced welds longitudinally along the bodies. The welds are spaced so as to maximize the resistance of the rack to seismic acceleration and spent-fuel storage locations are thus formed. Four storage locations extend radially from the apices of each location. A wrapper plate is secured to each side of each of these five locations providing a pocket for neutron-absorbing material. An additional storage location is formed between each location, two locations extending radially from each location and a location of another group of five locations. The additional location has pockets in common with the locations which bound it. The fuel storage pool where the rack is installed is divided into two regions. Region 1 is in a checkerboard pattern with locations corresponding to one set of squares capped. In Region 2, all cells are uncapped. Initially spent assemblies are deposited in Region 1. After fuel burn-up is checked, the fuel in Region 1 which has undergone at least a predetermined minimum burn-up is transferred to Region 2. The capped cells are provided to prevent the fuel in Region 1 of the rack from going critical.

6 Claims, 10 Drawing Sheets

STORAGE OF SPENT NUCLEAR FUEL

REFERENCE TO RELATED APPLICATION

This application is a continuation of application Ser. No. 470,905, filed Mar. 1, 1983, now abandoned.

BACKGROUND OF THE INVENTION

This invention relates to the nuclear-reactor art. In this art, the nuclear-reactor plants are provided with spent-fuel storage facilitates, specifically a spent-fuel storage pool having racks for storing spent fuel under a substantial depth of water. This invention relates particularly to the storage of spent fuel and to racks for storing such fuel.

Nuclear plants produce large quantities of spent fuel. In the past, it was contemplated that the spent fuel would be reprocessed to provide fissionable uranium and plutonium as a renewed fuel. But the Nuclear Non-Proliferation Treaty, to which the United States is a party, has been interpreted to bar the reprocessing of fuel inasmuch as plutonium, a product of the reprocessing, is a weapons material. It then becomes necessary to cope with the problem of safely handling the spent fuel which continuously emerges from nuclear plants. It is an object of this invention to provide an effective solution for this problem. It is contemplated that the spent fuel must be stored for a number of years before it can safely be disposed of as nuclear waste. The solution of the spent-fuel problem deals with the storage of the spent fuel during these years.

Spent fuel retains a measure of reactivity, i.e., neutron emissivity, which is appreciable but is insufficient for economic use in a reactor. It is then necessary that the spent fuel be stored in such a way that the mass stored does not become critical. In refueling a reactor, the fuel assemblies in specified areas of the reactor are replaced at intervals of several years. The residual reactivity of the removed fuel assemblies throughout each area of the refueling is not uniform. It is then necessary, in the storage of spent fuel, to preclude nuclear criticality by reason of the presence of fuel assemblies having high residual reactivity. In accordance with the teachings of the prior art, such criticality is precluded by providing racks whose cells are appropriately spaced. In addition, quantities of neutron-absorbing material or poison can be provided in the cells of the racks in which the spent fuel is stored. The first of these expedients requires that the volume occupied by racks be unreasonably large. The second expedient introduces a high cost factor. It is an object of this invention to provide for the storing of spent fuel in a way that shall be economic both financially and with respect to volume.

This invention relates to storage of spent fuel in a rack of uniformly spaced cells. The cell dimensions and the actual center-to-center (CTC) spacing is set to accommodate the types of fuel which are to be stored in the rack. Each fuel-storage pool is subdivided into two regions, herein designated Region 1 and Region 2. Region 1 is the smaller region and is reserved for off-core loading; i.e., for temporary loading of spent-fuel assemblies, regardless of burn-up, as they are removed from the reactor. Typically, Region 1 may serve to load about 200 fuel assemblies at a low fuel-assembly density using a fraction, usually half of the available storage locations. Region 2 is reserved for storing, for the required long time interval, the assemblies from Region 1 which have been found to have sustained at least a minimum predetermined burn-up. As used in this application, the expression "storage location" means generally a location where fuel assemblies are stored. Specifically, this term comprehends cells or locations which may be formed between a plurality of cells.

In Region 1 the storage locations are in a checkerboard pattern in a honeycomb type structure. One set of storage locations in this honeycomb are capped to prevent the insertion of fuel assemblies, while the other set is uncapped. In a typical checkerboard pattern, a square of one color, for example, black alternates with a square of another color, for example, red, so that the total area of black squares is equal to the total area of red squares. Typically, the checkerboard pattern or honeycomb structure of Region 1 in the practice of this invention may take this form. However, a structure in which a number of contiguous cells are capped in uniformly spaced areas of the cell surface may also be provided. This structure is necessary to reduce the possibility of criticality. The reference in this application to a "generally checkerboard" pattern is intended to cover this structure as well as one simulating an actual checkerboard. It is necessary that the reactivity $K_{eff}$ of the spent fuel assemblies in Region 1 be maintained at less than or equal to 0.95. For this purpose, the cells may be provided with neutron-absorbing material. The water in which the rack is immersed may be maintained adequately neutron absorbent by the solution therein of a boron compound or the compound of another neutron-absorbing element.

The spent-fuel assemblies in Region 1 are surveyed through administrative control to determine burn-up. Those assemblies that have sustained the required burn-up are transferred to Region 2 where they remain until their radioactivity is reduced to a magnitude permitting removal from the pool and other disposal.

It is desirable that, in the use of a spent-fuel storage pool, the option be afforded to include neutron-absorbing poison in the rack either before the rack is installed or after it is installed. In spent-fuel facilities in accordance with the teachings of the prior art, such racks are not provided. If neutron poison is necessary, it must be included before the rack is installed in the pool; it cannot readily be included in the rack after the rack is installed. Another deficiency of prior art spent-fuel facilities is that the CTC spacing between storage cells is maintained by grids or like components. This is an undesirable and space-consuming complication.

It is an object of this invention to overcome the above-described disadvantages and drawbacks of the prior art and to provide a spent-fuel storage rack which shall occupy a minimum volume and shall afford the option of including the nuclear poison either before or, readily, after the rack is installed in the pool and in whose use the CTC spacing shall be reliably maintained with economy in space and without spacing grids.

SUMMARY OF THE INVENTION

In accordance with this invention a spent-fuel storage rack is provided which which occupies a minimum volume. The cells of this rack are each composed of a body formed of sheet metal, typically stainless steel sheet. The sheet for each cell is formed into the desired shape, for example, an elongated hollow body of generally polygonal transverse cross section or of circular or other cross section. The bodies are mounted on a base plate with each body except those along the periphery of the rack, secured, to bodies adjacent to it, along a welded joint common to the secured bodies. The joint is formed by welds spaced longitudinally at the joint along the secured bodies. The spacing for each weld is such as to optimize the natural frequency of the rack to minimize the response produced by seismic accelerations characteristic of the geographical area where the rack is to be installed. Where the bodies are of transverse polygonal cross section, each body is secured to the adjacent bodies along the apices formed by the sides of the bodies.

It is desirable that the option be available to include neutron-absorbing poison either before or after the rack is installed. For this purpose, pockets for neutron-absorbing material are, in accordance with this invention, provided along the outer surface of each body which forms a cell. Each pocket is formed between the surface and a wrapper plate secured to the surface. Where the bodies are of polygonal section, a pocket is formed between each side of a body and the wrapper plate. An additional spent-fuel storage location is also formed between each body or cell and the sequential bodies or cells contiguous to it. This storage location has in common with the bodies between which it is formed the wall sections and pockets of the latter bodies. It is to be borne in mind that there is symmetry about each body within the rack and that the above selection of a body and the bodies secured to it is applicable to any set of bodies within the rack. Any body within the rack is at the same time a body to which adjacent bodies are secured, one of the secured bodies, or the additional bodies having walls common to the body having adjacent bodies secured to it and the sequential adjacent bodies.

The pockets have additional advantages. They maintain the required CTC spacing between the assemblies which are placed in the spent-fuel storage locations without the necessity for grids. In addition they maintain fuel-assembly-to-fuel-assembly separation which permits closer spacing of the fuel assemblies where this spacing is limited by the necessity of avoiding criticality. The assemblies are placed in the cells so as to have limited movement; typically the spacing of an assembly from the walls of a cell is ¼ inch.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DESCRIPTION OF THE PREFERRED EMBODIMENT

The apparatus shown in the drawings is a rack 31 for storing spent fuel. The rack 31 consists of an array of storage locations 29, 33, 35 and 75 (FIG. 5) secured to a base 32. The rack 31 is supported on the floor 34 of a deep pool of water on studs 36 extending from pads 38. The pads 38 are of the type disclosed in application Ser. No. 282,991, filed July 14, 1981 to Machado et al. for *Nuclear Reactor Spent Fuel Storage Rack* and assigned to Westinghouse Electric Corporation (herein Machado). The pads 38 are secured to the underside of the base 32 and are provided with facilitates for levelling the rack as disclosed in Machado. Lugs 40 are provided intermediate the pads 38. The lugs 40 are engageable by lifting rods (not shown) extending from a crane (not shown) for raising and lowering the rack 31.

Figure 5:
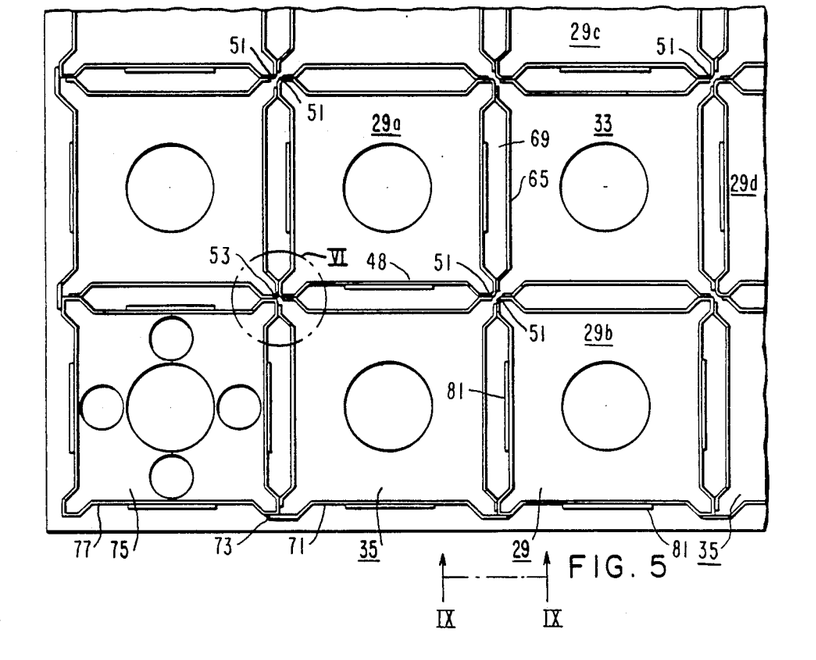
FIG. 5 is an enlarged fragmental plan view of the portion of FIG. 3 in block V of FIG. 3.
Figure 6:
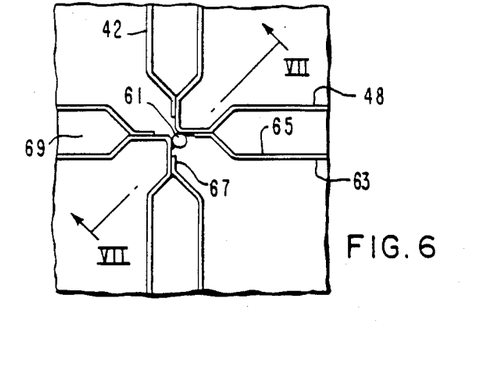
FIG. 6 is an enlarged fragmental plan view of the portion of FIG. 5 in circle VI of FIG. 5.

The cells 29, and cells 75 at the corners of rack 91, are fabricated and are arranged so that the additional locations 33 and 35 are formed between the of the cells 29 and between the cells 29 and 75. Each additional storage location is abutted by a plurality of fabricated storage locations (FIG. 5). The general term "storage locations" is applied to the fuel-assembly-receiving members generally including fabricated members or storage locations such as 29, 75 as well as storage locations 33, and 35 formed between fabricated cells 29, 75 as boundaries. The storage locations 29, 33, 35 and 75 have substantially equal open transverse cross sectional areas and are so dimensioned as to accommodate the spent-fuel assemblies of the plant where the rack is installed.

Figure 1:
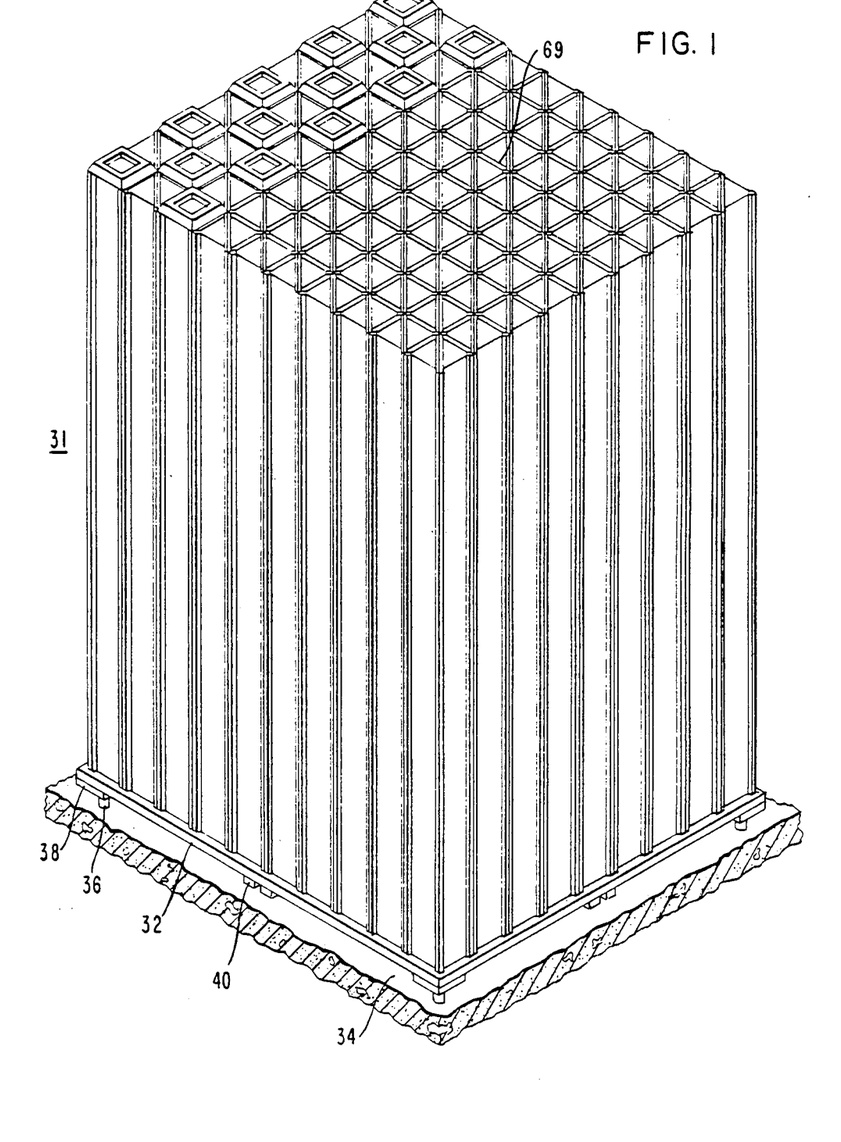
FIG. 1 is a view in isometric showing a rack for storing spent nuclear fuel in accordance with this invention.
Figure 2:
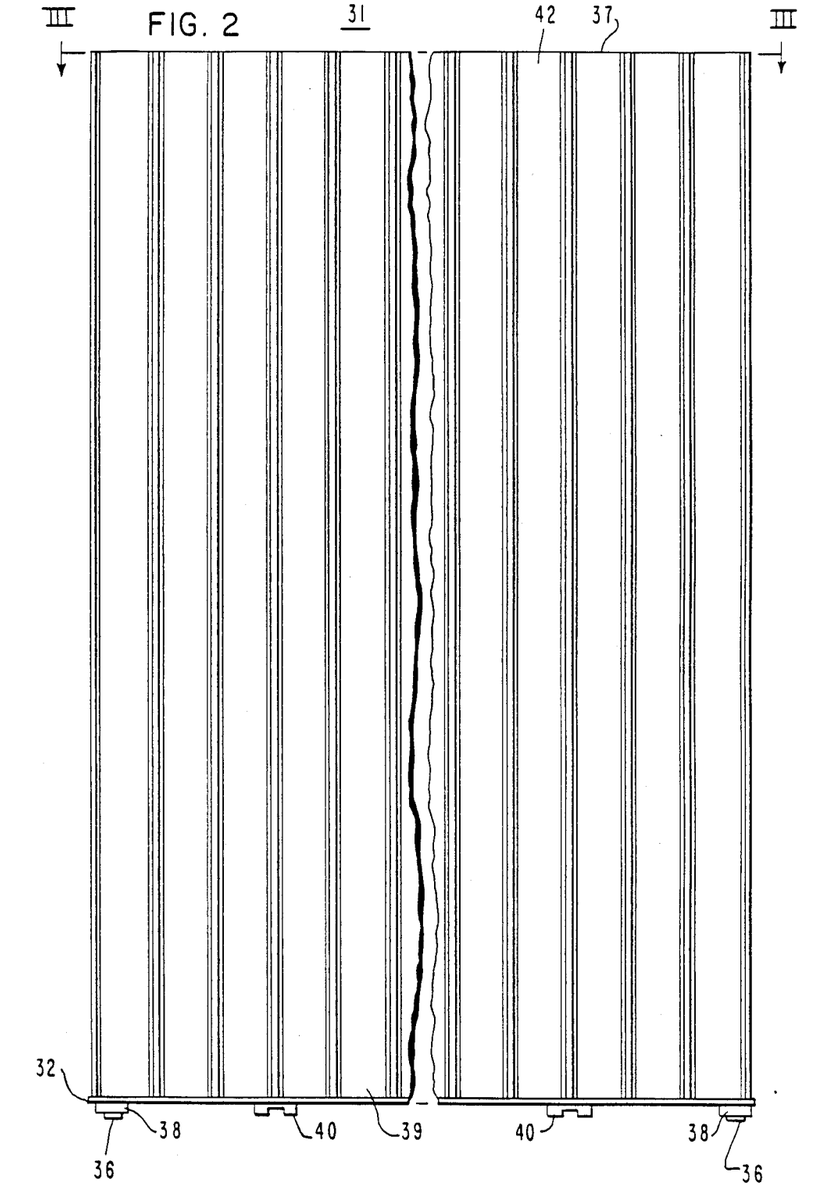
FIG. 2 is a view in side elevation of the rack shown in FIG. 1.
Figure 3:
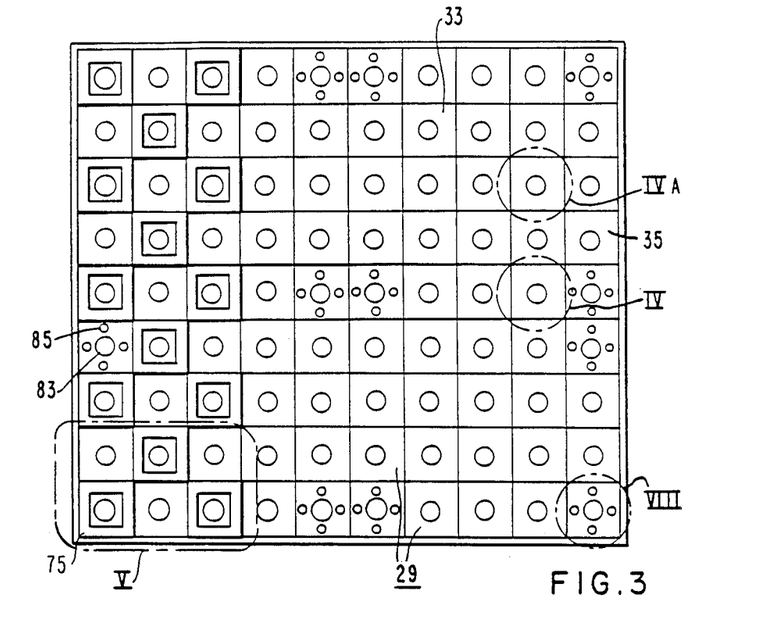
FIG. 3 is a plan view taken in the direction III—III of FIG. 2 simplified to show only the relative positions of the cells.
Figure 4:
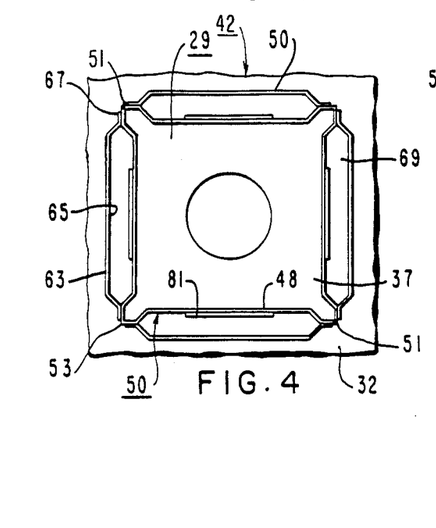
FIG. 4 is an enlarged fragmental view of the portion of FIG. 3 in circle IV showing the plan view of a cell at the position of the circle IV.
Figure 4A:
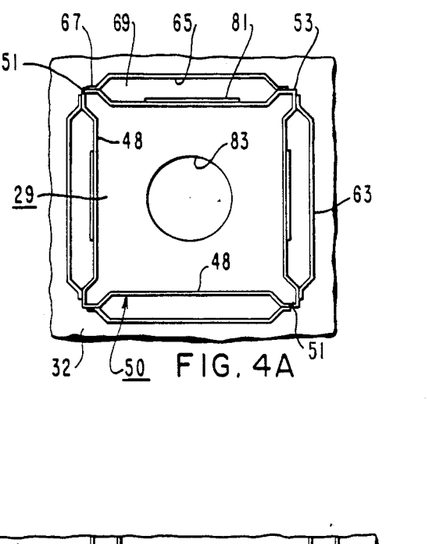
FIG. 4A is an enlarged fragmental plan view of the portion of FIG. 3 in the circle IVA of FIG. 3.
Figure 12:
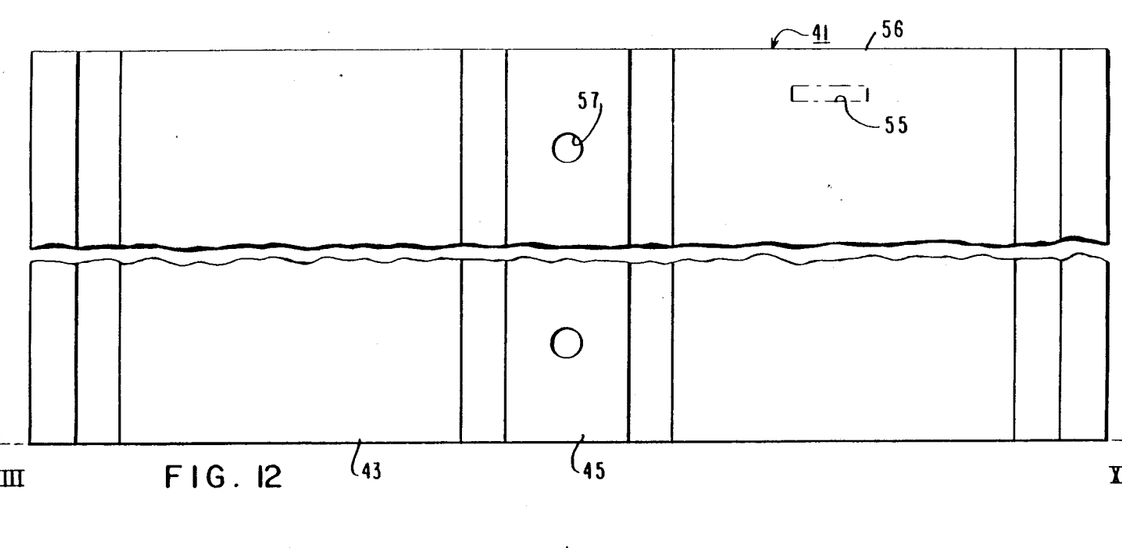
FIG. 12 is a plan view of the sheet from which a half section of a cell body is formed.
Figure 13:
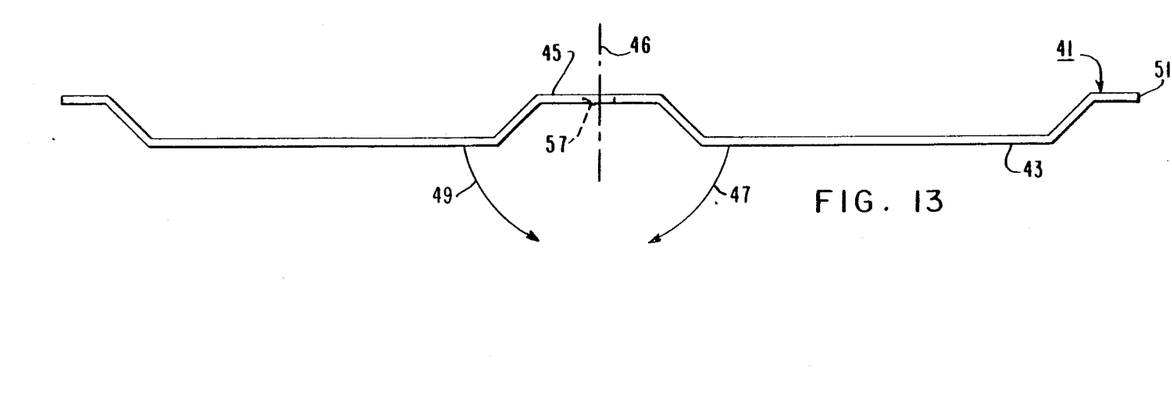
FIG. 13 is a view in end elevation of the sheet shown in FIG. 12.

Each cell 29 is an elongated body 42 which may be of polygonal or circular or other transverse cross sectional shape. Typically, the body 42 is in the form generally of an elongated rectangular parallelopiped with open ends 37 and 39 at the top and bottom. The body is formed of long sheets 41 (FIGS. 12, 13), typically of type 304 stainless steel, pressed into a structure consisting of two sections 43 channel-shaped downwardly as seen in FIG. 13 joined by a center section 45 channel-shaped upwardly. The so-formed sheet is bent at right angles about the longitudinal center line 46 of the center section in the direction of the arrows 47 or 49 to form two sides or walls 48 or a half section 50 of the body (FIGS. 4, 4A). A pair of these halves are abutted along these edges 51 and welded along the abutted edges to form the body 42. The sides 48 of the body are reentrant along the channel sections 43. The welded joints along the edges 51 and the joint 53 at the right angle bends of the halves project outwardly forming the apices of the transverse cross section of the body. The sheets 41 which form the halves of the bodies each has a slot 55 near the end 56 which is just below the top 37.

In a typical case the sheet 41; i.e., the body 42, may have a length or height of 162.00 inches. The width of the sheet 41 may be 20.883 inches and the thickness 0.062 inch. Another typical set of dimensions are length 188.87 inches, width 19.145 inches and thickness 0.075 inch.

Figure 7:
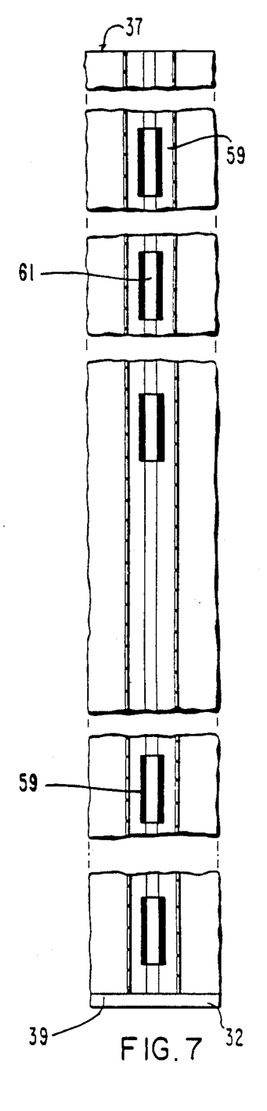
FIG. 7 is a view in section taken along direction VII—VII of FIG. 6 showing the positions of the welds joining corner of the cell bodies of the rack shown in FIG. 1.

The cells 29 may be regarded as being joined in a group consisting of a central cell 29 (FIG. 5) from each of whose edges 51 and 53 a cell 29 extends radially. Each edge 51 or 53 of a central cell is contiguous to an edge 51 and 53 of a radially extending cell 29. The contiguous edges are joined by a series of welds 59 along their lengths forming by fusing a filler wire 61 (FIG. 7). The welds 59 are so spaced that the response of the rack to the anticipated seismic acceleration of the rack in the geographical region where the rack is installed is minimized.

Figure 11:
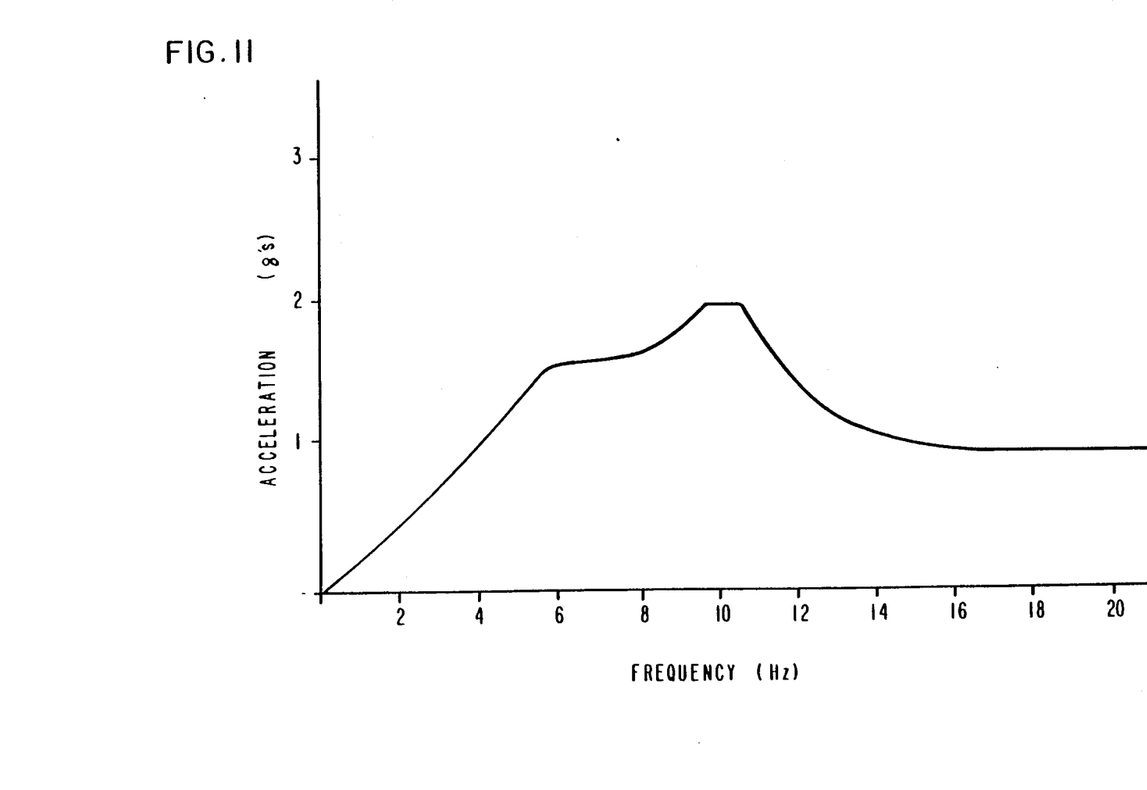
FIG. 11 is a graph showing the relationship between seismic vibrations and acceleration of a rack; this relationship is used in determining the spacing of the welds between the cell bodies of the rack shown in FIG. 1.

This feature can be understood from the graph shown in FIG. 11. The seismic vibration frequency of the rack, characteristic of the region of the plant, is plotted horizontally in Hertz and the acceleration in g, gravity constant, is plotted vertically. It is seen that the curve has a maximum at about 10 Hz. The welds 59 should be so spaced that the frequency is low. At low frequencies the acceleration is low. Seismic damage to the rack is precluded. The welds can also be spaced so that the seismic vibration frequency is high; i.e., the rack is stiff, where such a condition reduces acceleration.

Figure 14:
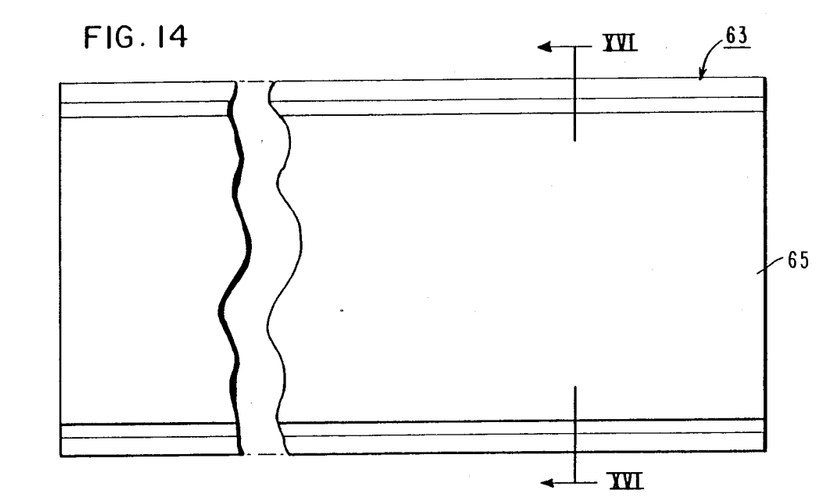
FIG. 14 is a plan view of the wrapper which forms the pocket with the sheet.
Figure 15:
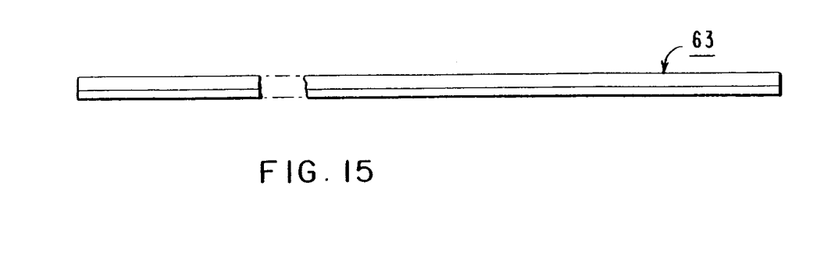
FIG. 15 is a view in end elevation of the wrapper shown in FIG. 14.
Figure 16:
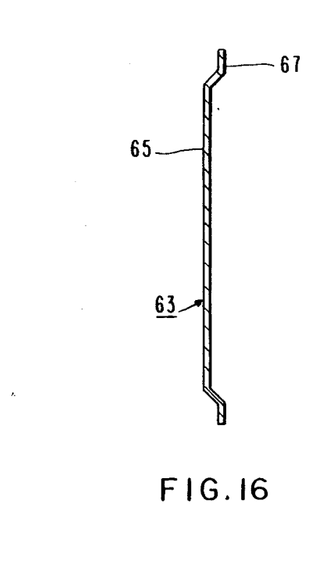
FIG. 16 is a view in section taken along direction XVI—XVI of FIG. 14.

A wrapper plate 63 is welded externally to each side of the body 42. The wrapper plate 63 (FIGS. 14-16) is a thin sheet of type 304 stainless steel pressed so that it has the form of an elongated channel 65. The wrapper plate may have different dimensions for different purposes. Typical dimensions are shown in the following Table I in inches.

TABLE I

| Length or Height Perpendicular to Base 32 | Width | Thickness |
| --- | --- | --- |
| 161.00 | 9.836 | .062 |
| 187.87 | 9.050 | .075 |
| 162.00 | 11.500 | .062 |
| 188.87 | 10.650 | .075 |

The wrapper plate 63 is welded at its extending edges 67 to each outer wall 48 (FIG. 4) of the body 42 with the cavity formed by the channel 65 facing the reentrant cavity of the wall so that each wall 48 and each wrapper plate form a pocket 69. The pocket 69 may serve for the deposit of neutron-absorbing material should the need arise. The pockets 69 provide the option for readily including neutron poison in the rack 31 either before or after the rack is installed in the pool.

The storage locations 33 are formed between each set of four cells 29. The four cells include a central cell, for example 29a (FIG. 5), two radial cells for example, 29b and 29c, welded to the central cell and a radial or central cell, for example 29d, of an adjacent group of welded cells 29. The walls of the storage locations 33 are the wrapper plates 63 welded to a wall 48 each of the adjacent cells 29. The storage location 33 has pockets 69 in common with each of the adjacent four cells 29 as shown in FIG. 5. Cell 29b is along the periphery of the rack 31. A number, usually most of the cells are formed between four internal cells 29a, 29b, 29c, 29d.

There are four pockets 69 in each storage location 29 and 33. The pockets are interposed in each storage location on each side between a stored spent-fuel assembly (not shown) and the fuel assemblies in adjacent storage locations which have walls in common with the storage location. The pockets 69 maintain the required CTC spacing between assemblies without the need of spacers, such as grids, between storage locations. The pockets 69 also maintain the fuel-assembly-to-fuel-assembly separation. This permits closer spacing of assemblies limited by criticality concerns.

Figure 8:
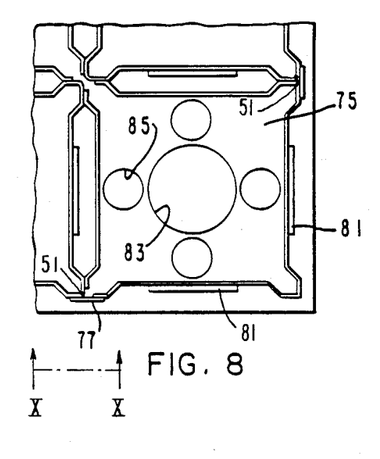
FIG. 8 is an enlarged fragmental plan view of the portion of FIG. 3 in circle VIII.
Figure 9:
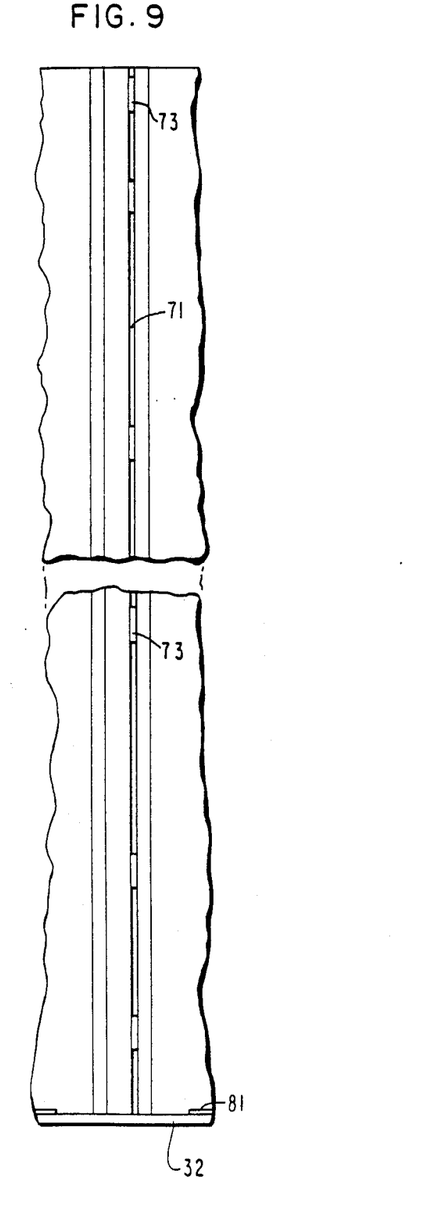
FIG. 9 is a view in side elevation enlarged taken in direction IX—IX of FIG. 5.
Figure 10:
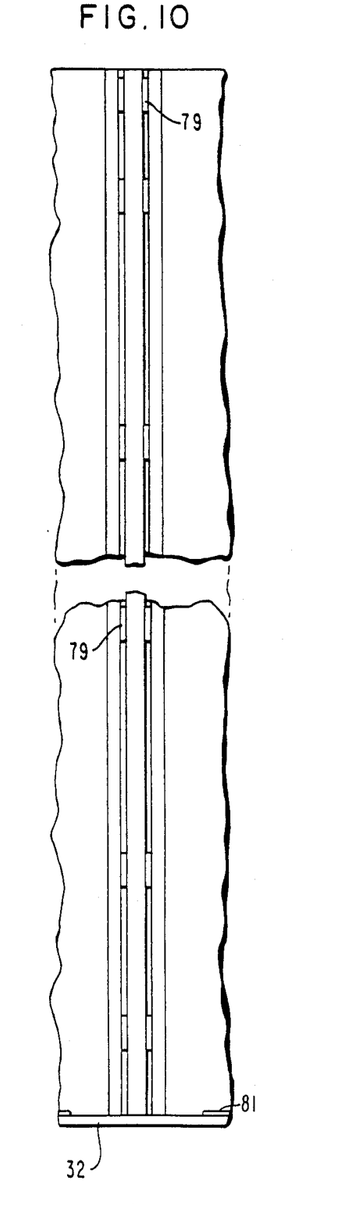
FIG. 10 is a view in side elevation enlarged taken in direction X—X of FIG. 8.

The cells or storage locations 35 are along the periphery of the rack. Each cell 35 is formed between three adjacent cells, for example 29a, 29b, 75 (or an internal fabricated cell 29). The remaining side of each cell 35 is formed by a cover plate 71. The cover plate 71 is joined to the ends (corners) of the contiguous cells by welds 73 along the longitudinal joints between the cover plate 71 and the edges 53 (FIG. 9). The welds 73 may be spaced in the same way as the welds 59. The cells 75 in the corners (FIGS. 5, 8) of the rack are closed by half angle sections 77 (FIG. 8) similar to the half sections 50 which are combined to form the cells 29. The ends of the half sections are welded to the ends of the joints 51 of the adjacent cells by spaced welds 79 (FIG. 10).

The storage locations 29, 33, 35 and 75 are secured to the base 32 by fillet welds 81 (FIGS. 4, 8) joining the lower ends of the walls 48 to the base. To the extent practicable the four walls 48 of each cell are welded to the base as shown in FIGS. 4 and 5. In cases in which one of the walls is not accessible, only three of the walls are welded to the base 32 as shown in FIGS. 4A and 5. Water is circulated through holes 83 and 85 in the base 32, upwardly along the cells, and through the pockets 69.

The fuel storage rack 31 is subdivided into Region 1, a smaller region, and Region 2, a larger region. Region 1 accommodates temporarily off-core spent-fuel assemblies. Region 2 accommodates assemblies with a specified minimum burn-up. The assemblies in Region 1 must be spaced substantial distances to avoid a critical condition. For this purpose, certain cells in Region 1 are provided with caps 101 (FIG. 17) to prevent inadvertent deposit of assemblies at too close a spacing. The caps 101 close the top openings of cells in Region 1 in a checkerboard or honeycomb pattern. However, instead of uncapped cells being encircled by single capped cells, an uncapped cell may be encircled by groups of several capped cells.

Figure 17:
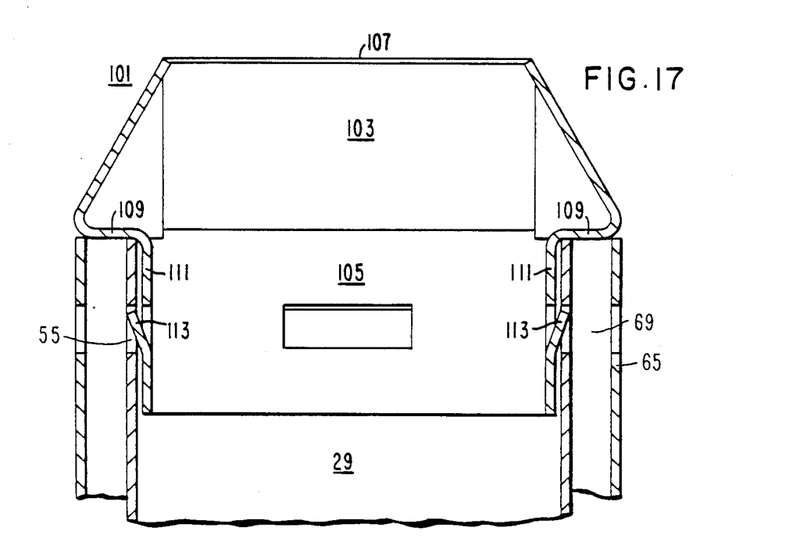
FIG. 17 is a view in longitudinal section showing the cap structure of the rack according to this invention.
Figure 18:
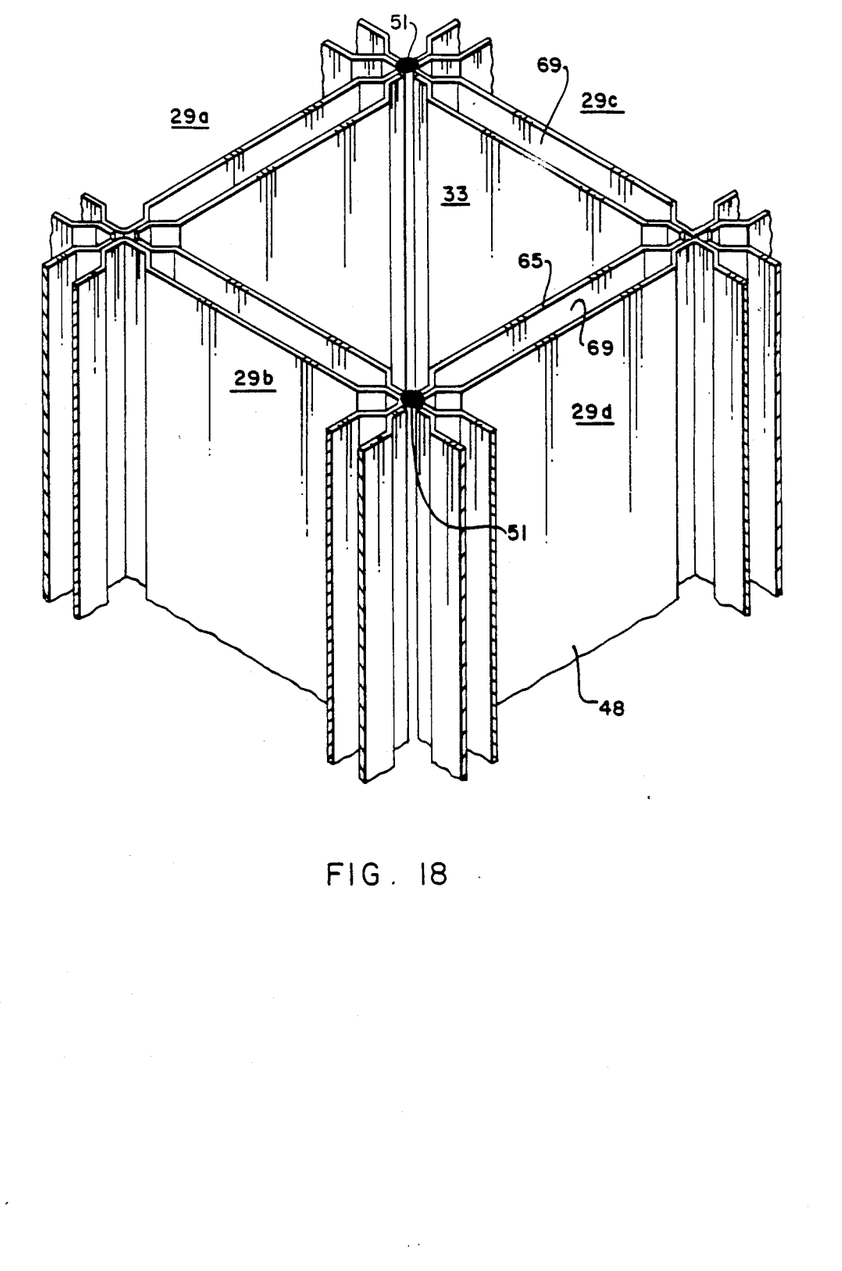
FIG. 18 is a view in isometric showing the storage location formed by a plurality of fabricated cells and its relationship to the abutting cells.

Each cap 101 has a head 103 and a stem 105. The head 103 is of generally rectangular transverse cross section and longitudinally tapers from an opening 107 at the top to a flat frame-like surface 109. The stem 105 is of generally rectangular transverse cross section. From opposite faces 111 of the stem, fingers 113 extend inwardly at an angle. The cap 101 is placed on a cell 29, 33, 35 or 75 with the stem penetrating into the cell and the flat surface 109 spanning the pockets 69 and in engagement with the upper rims of the walls forming the cell and the upper rims of the wrapper plate 65. The cap 101 is composed of stainless steel or other suitable metal so that the fingers 113 are resilient. When the cap 101 is thrust into the opening in a cell, the tips of the fingers 113 are sprung and penetrate into the slots 55 and lock the cap 101 in the cell. The cap can only be removed by a special tool which penetrates into the pocket 69 and retracts the fingers 113.

While preferred embodiments of this invention have been disclosed herein, many modifications thereof are feasible. This invention is not to be restricted except insofar as is necessitated by the spirit of the prior art.

We claim:

1. A rack for storing nuclear fuel assemblies, said rack including a base, an array of side-by-side fuel-storage locations, each location being a hollow body of rectangular transverse cross section formed of metallic sheet means which is readily bent, each said body having a volume therein dimensioned to receive a fuel assembly, said bodies being mounted on said base with each body secured to bodies adjacent said each body along welded joints, each said joint joining directly the respective contiguous corners of said each body and of said bodies adjacent to said each body and being formed by a series of separate welds spaced longitudinally between the tops and bottoms of the secured bodies along said each joint, the spacings of the separate welds being such that the response of the rack when it is subjected to the anticipated seismic acceleration of the rack, characteristic of the geographical region where the rack is installed, is minimized.

2. The rack of claim 1 wherein each body is formed of sheets of transverse angular cross-section whose longitudinal edges abut and are joined.

3. A rack for storing nuclear fuel assemblies, said rack including a base, an array of side-by-side fuel-storage locations, each location being a hollow body of rectangular transverse cross section formed of metallic sheet means, which is readily bent, each said body having a volume therein dimensioned to receive a fuel assembly, each said body being mounted on said base with elongated portions thereof, transverse to said base, and with the corners of adjacent bodies face-to-face with corresponding face-to-face corners of adjacent bodies in said array, filler-wire welds bridging directly between each corner of each body and the corresponding face-to-face face corners of each adjacent body, the said each body being joined to said each adjacent body by a series of filler-wire welds, at spaced intervals between the tops and bottoms of said last-named face-to-face corners extending longitudinal of said contiguous corners formed by fusing a filler wire at said spaced intervals.

4. The rack of claim 3 wherein each body is formed of sheets of transverse angular cross-section whose longitudinal edges abut and are joined.

5. A rack of storing nuclear fuel assemblies, said rack including a base, an array of side-by-side fuel-storage locations, each location being a hollow body of generally polygonal transverse cross section formed of metallic sheet means, which is readily bent, each said body having a volume therein dimensioned to receive a fuel assembly, each said body being mounted on said base with the corners thereof, which are formed between intersecting sides and are transverse to the base, face-to-face with corresponding corners of adjacent bodies in the array, filler wire-welds bridging directly between each corner of each body and the corresponding facing corner of each adjacent body, the said each body being joined to said adjacent bodies by a series of welds at spaced intervals between the tops and bottoms of said bodies extending longitudinally of the facing corners formed by fusing the filler wire at said spaced intervals.

6. A rack for storing nuclear fuel assemblies, said rack including a base, an array of side-by-side fuel-storage locations, each location being a hollow body of polygonal transverse cross-section formed of metallic sheet means, which is readily bent, each said body having a volume therein dimensioned to receive a fuel assembly, said bodies being mounted on said base with each body secured to bodies adjacent said each body along welded joints, each said joint joining directly the corners of said each body to the corner of adjacent of said bodies which are respectively contiguous to said corners of said each body and being formed by a series of separate welds extending longitudinally between the tops and bottoms of the secured bodies along said each joint, the spacings of the separate welds being such that the response of the rack when it is subjected to the anticipated seismic acceleration of the rack, characteristic of the geographical region where the rack is installed, is minimized.

* * * * *